United States Patent
Lee et al.

(10) Patent No.: US 9,979,233 B2
(45) Date of Patent: May 22, 2018

(54) APPARATUS AND METHOD FOR CHANGING MAGNETIC FLUX DENSITY AND RECEIVING WIRELESS POWER

(71) Applicant: LG INNOTEK CO., LTD., Seoul (KR)

(72) Inventors: Dong Hyuk Lee, Seoul (KR); Ji Yeon Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 399 days.

(21) Appl. No.: 14/707,826

(22) Filed: May 8, 2015

(65) Prior Publication Data
US 2016/0241046 A1 Aug. 18, 2016

(30) Foreign Application Priority Data
Feb. 16, 2015 (KR) ........................ 10-2015-0023666

(51) Int. Cl.
*H02J 5/00* (2016.01)
*H02J 50/12* (2016.01)
*H02J 50/90* (2016.01)

(52) U.S. Cl.
CPC .............. *H02J 50/12* (2016.02); *H02J 50/90* (2016.02)

(58) Field of Classification Search
CPC .................................. H02J 50/12; H02J 50/90
USPC ......................................................... 307/104
See application file for complete search history.

(56) References Cited

U.S. PATENT DOCUMENTS

| | | | | |
|---|---|---|---|---|
| 8,169,185 B2* | 5/2012 | Partovi | ................... | H01F 5/003 320/108 |
| 8,723,366 B2* | 5/2014 | Fiorello | ................. | H01F 38/14 307/104 |
| 9,035,605 B2* | 5/2015 | Tabata | .................... | H01F 38/14 320/108 |
| 9,472,336 B2* | 10/2016 | Jung | .................... | H01F 27/2871 |
| 9,564,776 B2* | 2/2017 | Lampinen | ............... | H02J 5/005 |
| 2012/0052923 A1* | 3/2012 | Park | ...................... | H01M 10/44 455/567 |
| 2012/0098349 A1* | 4/2012 | Kim | ...................... | H04B 5/0037 307/104 |
| 2012/0319647 A1* | 12/2012 | Itabashi | ............ | H02M 3/33553 320/108 |
| 2013/0093390 A1* | 4/2013 | Partovi | ................... | H02J 7/025 320/108 |
| 2013/0300352 A1* | 11/2013 | Kuk | ........................ | H02J 7/025 320/108 |

(Continued)

OTHER PUBLICATIONS

CRS Holdings Inc., Everything about soft magnetic alloys, Oct. 1, 2012, www.SoftMagneticAlloy.com/selecting_soft_magnetic_alloys.html.*

*Primary Examiner* — Jared Fureman
*Assistant Examiner* — Michael Warmflash
(74) *Attorney, Agent, or Firm* — Birch, Stewart, Kolasch & Birch, LLP

(57) ABSTRACT

The embodiment relates to an apparatus and a method for receiving wireless power. The apparatus for receiving the wireless power according to the embodiment includes: a coil to receive the power; and a metal member to be detected by the apparatus for transmitting wireless power, wherein the coil has an empty central region, the metal member is disposed in the empty central region of the coil, and the metal member includes a stainless steel plate.

13 Claims, 13 Drawing Sheets

(56) References Cited

U.S. PATENT DOCUMENTS

| | | | |
|---|---|---|---|
| 2013/0314035 A1* | 11/2013 | Kohlschmidt | H02J 7/025 320/108 |
| 2015/0213933 A1* | 7/2015 | Lee | H01F 7/0231 307/104 |
| 2015/0214749 A1* | 7/2015 | Park | H02J 5/005 307/104 |

* cited by examiner

APPARATUS AND METHOD FOR CHANGING MAGNETIC FLUX DENSITY AND RECEIVING WIRELESS POWER

BACKGROUND

The embodiment relates to an apparatus and a method for receiving wireless power of a wireless power charge system.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance is short.

Until now, wireless energy transmission schemes include a remote telecommunication technology based on resonance and a short wave radio frequency in addition to the electromagnetic induction.

Recently, among wireless power transmission technologies, an energy transmitting scheme employing resonance has been widely used.

In a wireless power transmission system employing resonance, since power is wirelessly transferred through coils of the wireless power transmitter and the wireless power receiver, a user may easily charge electronic appliances such as a portable device.

The wireless power receiver is provided with a magnet such that the wireless power transmitter senses the wireless power receiver. The wireless power transmitter senses a magnetic field by the magnet of the wireless power receiver and determines whether to charge the wireless power receiver.

However, in the related art, the magnet of a wireless power receiver has been formed of rare earth elements and the rare-earth magnet is very expensive, so that the cost of manufacturing the wireless power receiver is increased.

In addition, the magnet of a wireless power receiver according to the related art does not meet the arrangement requirements defined in the standard.

SUMMARY

The embodiment provides an apparatus for receiving wireless power and a terminal, which can be manufactured at a low cost.

The embodiment provides an apparatus for receiving wireless power and a terminal, which include a metal member arranged according to the standard.

The embodiment provides an apparatus for receiving wireless power and a terminal, which include a metal member optimally disposed to sufficiently sense an apparatus for transmitting wireless power or a holder even when a bottom cover has a thick thickness.

An apparatus for receiving wireless power according to the embodiment includes: a coil to receive the power; and a metal member to be detected by an apparatus for transmitting the wireless power, wherein the coil has an empty central region, the metal member is disposed in the empty central region of the coil, and the metal member includes a stainless steel plate.

In addition, a method for receiving wireless power from an apparatus for transmitting the wireless power according to the embodiment includes: triggering a sensor of the apparatus for transmitting the wireless power by a metal member in an apparatus for receiving the wireless power; transmitting an effective signal to the apparatus for transmitting the wireless power; receiving an identification signal from the apparatus for transmitting the wireless power; and receiving the power from the apparatus for transmitting the wireless power, wherein the metal member includes a stainless steel plate.

The embodiments have the following effects.

First, an inexpensive stainless steel sheet is used for the metal member provided in the terminal so that the unit price of a product may be reduced.

Second, the metal member provided in the terminal is optimally disposed so that the magnetic member may have the intensity of magnetic flux density defined in the standard.

Third, the diameter of the metal member and the thickness of the bottom cover, which are provided in the terminal, are optimized so that the possibility of an error for the approach of the terminal to the holder can be reduced.

Meanwhile, other various effects will be directly and implicitly described below in the description of the embodiment.

DETAILED DESCRIPTION OF THE EMBODIMENTS

Figure 1:
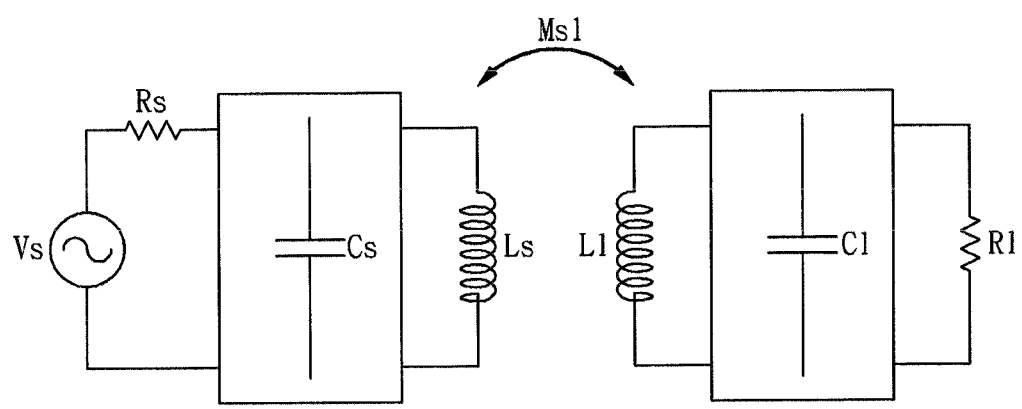
FIG. 1 is an equivalent circuit of a magnetic induction scheme.

In the description of the embodiments, it will be understood that, when a constituent element is referred to as being "on" or "under" another constituent element, it can be "directly" or "indirectly" on the other constituent element, or one or more intervening elements may also be present. In addition, the terminology of 'on (above)' and 'under (below)' may include both the meanings of 'upward' and 'downward' based on one constituent element.

The embodiment selectively uses various types of frequency bandwidths in the range of a low frequency wave (50 kHz) to a high frequency wave (15 MHz) for transmitting wireless power, and requires a support of a communication system which is capable of exchanging data and control signals for system control.

The embodiment can be employed in various industrial fields, such as a mobile terminal industry, a smart clock industry, a computer and laptop industry, an electronic device industry, an electric vehicle industry, a medical device industry, a robot industry, etc.

The embodiment may include a system capable of transmitting power to one or more devices by using one or multiple transmission coils constituting the device.

According to the embodiment, the problem of low battery for mobile devices such as smartphones, laptops, etc. can be solved. For example, when the smartphone and the laptop are seated and used on a wireless charging pad on a table, the battery is automatically charged and used for a long period of time. In addition, when the wireless charging pad is installed at public areas such as coffee shops, airports, taxis, offices, restaurants, etc., various mobile devices can be charged regardless of charging terminals which may vary depending on the manufacturer of the mobile device. Further, when the wireless power transfer technology is employed in electrical appliances such as vacuum cleaners, electric fans, etc., users may not need to look for the power cable, and tangled electrical cables can be eliminated at home so wirings in buildings can be reduced and space can be more efficiently utilized. In addition, a long period of time is required when an electric vehicle is charged by a typical household power source. However, when a high amount of power is transmitted through the wireless power transfer technology, charging time can be reduced, and when wireless charging equipment is installed at a floor of a parking lot, an inconvenience of preparing a power cable in the vicinity of the electrical vehicle can be relieved.

Definitions and abbreviations used in the embodiment are as follows.

Wireless Power Transfer System: A system for transmitting wireless power in a magnetic field region.

Wireless Power Transfer System-Charger: An apparatus for transmitting wireless power to multiple power devices in a magnetic field region and for managing the entire system.

Wireless Power Transfer System-Device: An apparatus for receiving wireless power from a wireless power transfer system-charger in a magnetic field region.

Charging Area: An area in which the wireless power is transmitted in the magnetic field region, and which may vary according to a size of an application product, required power and an operating frequency.

Scattering parameter: A scattering parameter is a ratio of an input voltage to an output voltage in a frequency distribution, a ratio of an input port to an output port (Transmission; S21) or a self-reflection value of each input/output port, in other words, a value of an output reflecting back by a self-input (Reflection; S11, S22).

Quality factor (Q): A value of Q in a resonant state designates a quality of frequency selection, in which a resonance characteristic is better when the value of Q is higher, and the value of Q is expressed as a ratio of stored energy to energy loss in a resonator.

The principle of wirelessly transferring power mainly includes a magnetic induction scheme and a magnetic resonance scheme.

The magnetic induction scheme is a non-contact energy transfer technology, in which a magnetic flux generated by a current flowing through a source inductor when the source inductor Ls is moved toward a load inductor Ll is used as a medium to generate an electromotive force. In addition, the magnetic resonance scheme generates a magnetic resonance from a natural frequency between two resonators by coupling the two resonators to utilize a resonance scheme for forming an electric field and a magnetic field in the same wavelength range while fluctuating in a same frequency thereby wirelessly transferring energy.

FIG. 1 is an equivalent circuit of a magnetic induction scheme.

Referring to FIG. 1, in the induction scheme equivalent circuit, the wireless power transfer system-charger may be implemented by a source voltage Vs according to an apparatus for supplying power, a source resistance Rs, a source capacitor Cs for impedance matching and a source coil Ls for an magnetic coupling. the wireless power transfer system-device may be implemented by a load resistance Rl which is an equivalent resistance of the wireless power transfer system-device, a load capacitor Cl for impedance matching, and a load coil Ll for the magnetic coupling with the wireless power transfer system-charger, in which an amount of magnetic coupling between the source coil Ls and the load coal Ll may denote a mutual inductance Msl.

In FIG. 1, a ratio S21 of an input voltage to an output voltage from a magnetic induction equivalent circuit including only a coil without the source capacitor Cs and the load capacitor Cl for the impedance matching is calculated and when a maximum power transmission condition is calculated from the calculation, the maximum power transmission condition satisfies the following equation 1.

$$Ls/Rs=Ll/Rl \qquad \text{Equation 1:}$$

According to the equation 1, a maximum power transmission is possible when a ratio of an inductance of the transmission coil Ls to the source resistance Rs is same as a ratio of an inductance of the load coil Ll to the load resistance Rl. Because a capacitor for compensating for a reactance does not exist in a system in which only an inductance exist, a self-reflection value S11 of an input/output port at a position on which maximum power is transferred may not be 0, and a maximum transfer efficiency may be varied according to the mutual inductance Msl. Accordingly, the source capacitor Cs may be added to the wireless power transfer system-charger and the load capacitor Cl may be added to the wireless power transfer system-device for compensation capacitors for the impedance matching. The compensation capacitors Cs, Cl, for example, may be serially connected or connected in parallel with each of the reception coil Ls or the load coil Ll, respectively. In addition, passive elements such as an additional capacitor and an inductor may be added along with the compensation capacitors to each of the wireless power transfer system-charger and the wireless power transfer system-device for the impedance matching.

Figure 2:
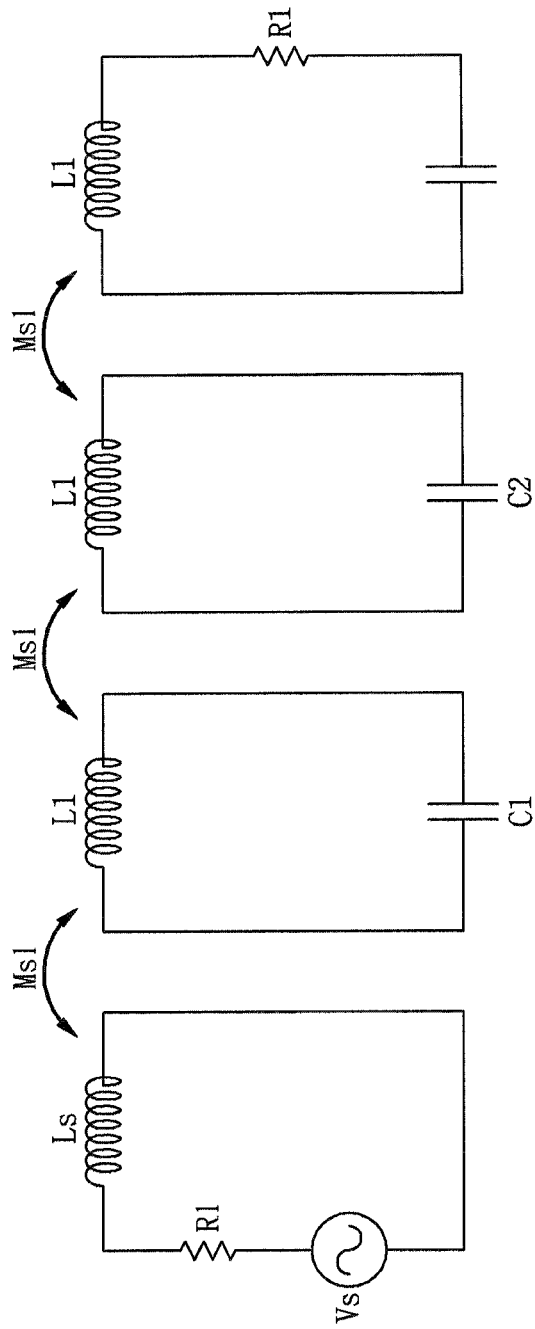
FIG. 2 is an equivalent circuit of a magnetic resonance scheme.

FIG. 2 is an equivalent circuit of a magnetic resonance scheme.

Referring to FIG. 2, in the magnetic resonance scheme equivalent circuit, the wireless power transfer system-charger may be implemented by a source coil forming a closed loop circuit by a serial connection of the source voltage Vs, the source resistance Rs and the source inductor Ls, and a transmission side resonance coil forming a closed loop circuit by a serial connection of a transmission side resonance inductor L1 and a transmission side resonance capacitor C1, the wireless power transfer system-device may be implemented by a load coil forming a closed loop circuit by a serial connection of the load resistance Rl and the load inductance Ll and a reception side resonance coil forming a closed loop circuit of a reception side resonance inductor L2 and a reception side resonance capacitor C2, in which the source inductor (Ls) and the transmission side inductor L1 are magnetically coupled in a coupling coefficient of K01, the load source inductor Ls and the load side resonance inductor L2 are magnetically coupled in a coupling coefficient of K23, and the transmission side resonance inductor L1 and the reception side resonance inductor L2 are magnetically coupled in a coupling coefficient of L12.

In the magnetic resonance scheme, most of the energy in the resonator of the wireless power transfer system-charger is transferred to the resonator of the wireless power transfer system-device when the resonance frequency of the two resonators are the same, so that the power transfer efficiency can be improved and the efficiency of the magnetic resonance scheme becomes better when satisfying the following equation 2.

$$k/\Gamma \gg 1 \text{ (}k \text{ is a coupling coefficient, } \Gamma \text{ is a damping ratio)} \qquad \text{Equation 2:}$$

In the magnetic resonance scheme, an element for the impedance matching may be added to improve the efficiency, and the impedance matching element may be a passive element such as an inductor and a capacitor.

A system for transmitting wireless power, in which power is transferred by the magnetic induction scheme or the magnetic resonance scheme based on the principle for transmitting wireless power, will be examined.

Figure 3:
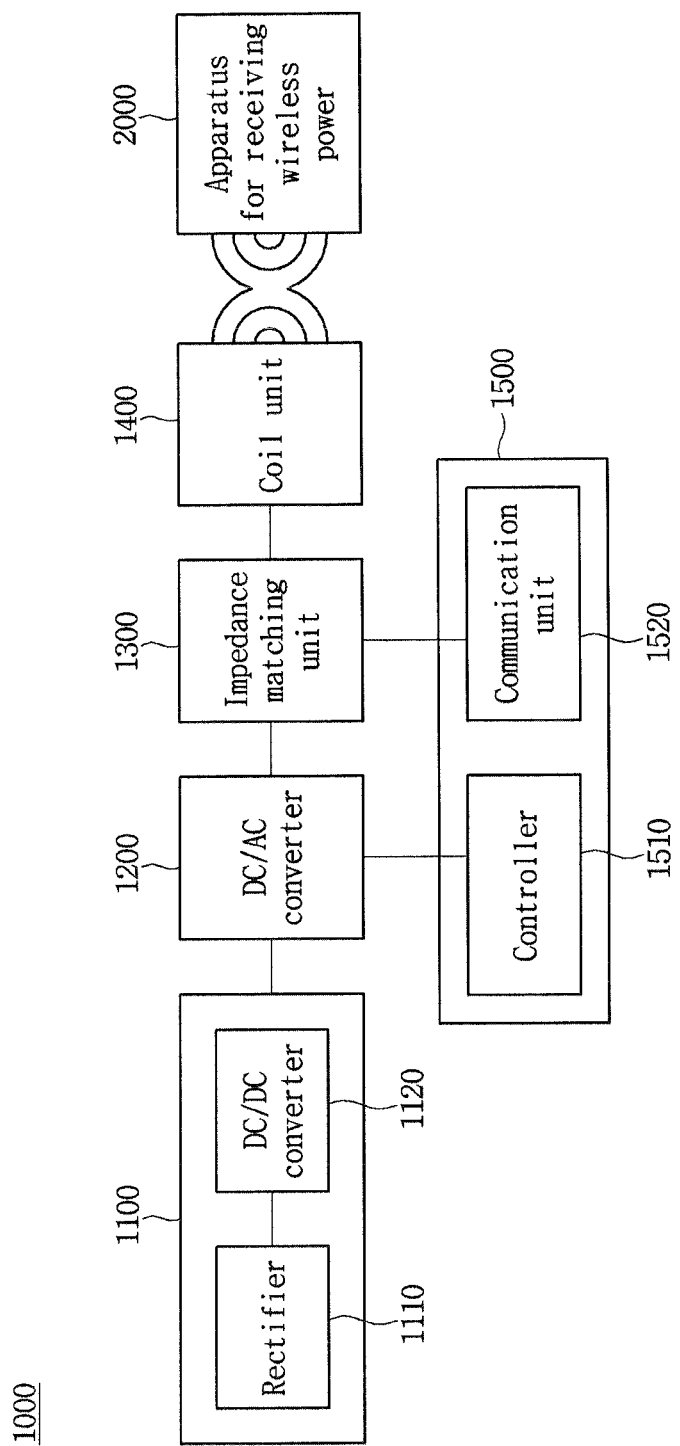
FIG. 3 is a block diagram showing a wireless power transfer system-charger, which is one of a sub-system constituting a wireless power transfer system.

FIG. 3 is a block diagram showing a wireless power transfer system-charger, which is one of a sub-system constituting a wireless power transfer system.

Referring to FIG. 3, the system for transmitting wireless power may include the wireless power transfer system-charger 1000 and the wireless power transfer system-device 2000 which wirelessly receives power from the wireless power transfer system-charger 1000, in which the wireless power transfer system-charger 1000 may include a transmission side AC/DC converting unit 1100, a transmission side DC/AC converting unit 1200, a transmission side impedance matching unit 1300, a transmission coil unit 1400 and a transmission side communication and control unit 1500.

The transmission side AC/DC converting unit 1100 is a power converter which converts an AC signal externally received under a control of the transmission side communication and control unit 1500 to a DC signal, in which the transmission side AC/DC converting unit 1100 may be a sub-system including a rectifier 1110 and a transmission side AC/DC converter 1120. The rectifier 1110 is a system for converting the supplied AC signal to the DC signal, and for an embodiment for implementing the rectifier 1110, a diode rectifier having a relatively high efficiency when operating at high frequencies, a synchronous rectifier capable of being made into one-chip, or a hybrid rectifier by which cost and space can be reduced and having a high freedom of a dead time may be used. In addition, the transmission side AC/DC converter 1120 controls a level of the DC signal provided by the rectifier 1100 under the control of the transmission side communication and control unit 1500, and for an embodiment for implementing the transmission side AC/DC converter 1120, a buck converter which lowers a level of the input signal, a boost converter which increases the level of the input signal and a buck boost converter or a Cuk converter which lowers or increases the level of the input signal may be used. In addition, the transmission side AC/DC converter 1120 may include a switching device which controls a power conversion, an inductor and a capacitor which smooth the output voltage, and a transformer which modifies a voltage gain or performs an electrical separation (insulation) function, and remove a ripple component or a pulsation component (AC component included in DC component) included in the DC signal. Further, an error between a command value of the output signal of the transmission side AC/DC converter 1120 and an actual output value may be controlled through a feedback scheme, which can be performed by the transmission side communication and control unit 1500.

The transmission side DC/AC converter 1200 is a system capable of converting the DC signal outputted from the transmission side AC/DC converting unit 1100 to the AC signal under the control of the transmission side communication and control unit 1500 and controlling a frequency of the converted AC signal, and for an embodiment for implementing the transmission side DC/AC converter 1200, a half bridge inverter or a full bridge inverter may be used. In addition, the transmission side DC/AC converter 1200 may include an oscillator to generate the frequency of the output signal and a power amplifying unit to amplify the output signal.

The transmission side impedance matching unit 1300 minimizes a reflection wave at a position at which impedances are different thereby improving a flow of the signal. The two coils of the wireless power transfer system-charger 1000 and the wireless power transfer system-device 2000 are spatially separated from each other so a large amount of the magnetic field is leaked, so an efficiency of power transfer may be improved by compensating for the impedance difference between the two connecting parts of the wireless power transfer system-charger 1000 and the wireless power transfer system-device 2000. The transmission side impedance matching unit 1300 may include an inductor, a capacitor and a resistor, and may modify an impedance value for the impedance matching by varying an inductance of the inductor, a capacitance of the capacitor and a resistance value of the resistor under the control of the transmission side communication and control unit 1500. In addition, when the wireless power transfer system transfers power by the magnetic induction scheme, the transmission side impedance matching unit 1300 may have a serial resonance structure or a parallel resonance structure, and energy loss can be minimized by increasing an induction coupling coefficient between the wireless power transfer system-charger 1000 and the wireless power transfer system-device 2000. Further, when the wireless power transfer system transfers power by the magnetic resonance scheme, the transmission side impedance matching unit 1300 allows the impedance to be matched in real-time according to a change in the distance between the wireless power transfer system-charger 1000 and the wireless power transfer system-device 2000 or mutual influence from metallic foreign substances and various devices, and a multiple matching scheme using a capacitor, a matching scheme using multiple antennas, a scheme using multiple loops may be used for the compensation scheme.

The transmission side coil 1400 may be implemented by a plurality of coils or a single coil, and, when the transmission side coil 1400 includes a plurality of coils, the coils may be spaced apart from each other or overlapping, and when the coils are overlapping, an overlapped area may be determined by taking a deviation of the magnetic flux density into consideration. In addition, the transmission side coil 1400 may be produced by taking an internal resistance and a radiation resistance into consideration, and in this case, when the resistance component is small, the quality factor and the transmission efficiency can be improved.

The communication and control unit 1500 may be a sub-system including a transmission side controller 1510 and a transmission side communication unit 1520. The transmission side controller 1510 may control the output voltage of the transmission side AC/DC converter 1100 by considering an amount of required power, a currently charged amount and a wireless power scheme of the wireless power transfer system-device 2000. In addition, the power to be transmitted may be controlled by generating a frequency and a switching waveform to drive the transmission side DC/AC converter 1200 by taking the maximum power transmission efficiency into consideration. Further, an algorithm, a program or an application required for the control read from a storage unit (not shown) of the wireless power transfer system-device 2000 may be used to control an overall operation of the wireless power transfer system-device 2000. Meanwhile, the transmission side controller 1510 may signify a microprocessor, a micro-controller unit or a micom. The transmission side communication unit 1520 may communicate with a reception side communication unit 2620, and for an example of a communication scheme, a Bluetooth scheme may be used. The transmission side communication unit 1520 and the reception side communication unit 2620 may transceive charging situation information and charging control command with each other. In addition, the charging situation information may include a number of the wireless power transfer system-device 2000, a residual quantity of a battery, a number of charges, an amount of usage, a capacity of the battery, a ratio of the battery and an amount of transferred power of the wireless power transfer system-charger 1000. Further, the transmission side communication unit 1520 may transmit a charging function control signal to control a charging function of the wireless power transfer system-device 2000, the charging function control signal may enable or disable the charging function by controlling the wireless power transfer system-device 2000.

Meanwhile, the wireless power transfer system-charger 1000 may include a hardware different from the transmission side communication unit 1520 so that the wireless power transfer system-charger 1000 communicate in an out-band type. In addition, the wireless power transfer system-charger 1000 and the transmission side communication unit 1520 may be implemented as single hardware, so that the wireless power transfer system-charger 1000 communicates in an in-band type. Further, the transmission side communication unit 1520 may be separately provided from the transmission side controller 1510, and the reception side communication unit (2620) may be included in the controller 2610 of the reception device or separately provided from the controller 2610 of the reception device.

Figure 4:
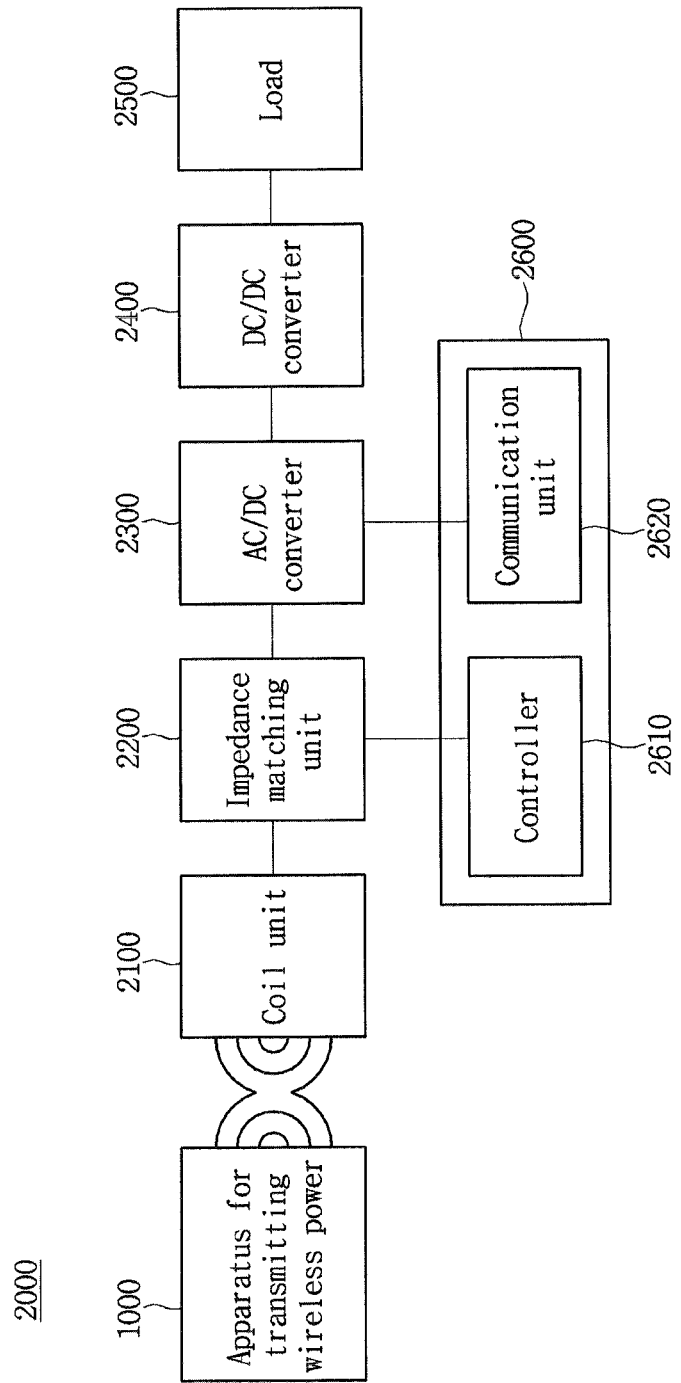
FIG. 4 is a block diagram showing a wireless power transfer system-device, which is one of a sub-system constituting the wireless power transfer system.

FIG. 4 is a block diagram showing a wireless power transfer system-device, which is one of a sub-system constituting the wireless power transfer system.

Referring to FIG. 4, the wireless power transfer system may include the wireless power transfer system-charger 1000 and the wireless power transfer system-device 2000 which wirelessly receives power from the wireless power transfer system-charger 1000, in which the wireless power transfer system-device 2000 may include a reception side coil unit 2100, a reception side impedance matching unit 2200, a reception side AC/DC converter 2300, a DC/DC converter (2400, a load 2500 and a reception side communication and control unit 2600.

The reception side coil unit 2100 may receive the power through the magnetic induction scheme or the magnetic resonance scheme. Accordingly, the reception side coil unit 2100 may include at least one of an induction coil and a resonance coil according to the power reception scheme. In addition, the reception side coil unit 2100 may further include Near Field Communication. Further, the reception side coil unit 2100 may be same as the transmission side coil unit 1400, and a specification of a reception antenna may vary according to an electrical characteristic of the wireless power transfer system-device 2000.

The reception side impedance matching unit 2200 may match the impedance between the wireless power transfer system-charger 1000 and the wireless power transfer system-device 2000.

The reception side AC/DC converter 2300 generates a DC signal by rectifying the AC signal outputted by the reception side coil unit 2100.

The reception side DC/DC converter 2400 may control a level of the DC signal outputted by the reception side AC/DC converter 2300 to match an amount of the load 2500.

The load 2500 may include a battery, a display, an audio output circuit, a main processor and various sensors.

The reception side communication and control unit 2600 may be activated by a wake-up power from the transmission side communication and control unit 1500, communicate with the transmission side communication and control unit 1500, and control a sub-system of the wireless power transfer system-device 2000.

A plurality of the wireless power transfer system-devices 2000 or a single wireless power transfer system-device 2000 may be provided to simultaneously and wirelessly receive energy from the wireless power transfer system-charger 1000. In other words, in the wireless power transfer system using the magnetic resonance scheme, a plurality of the wireless power transfer system-devices 2000 may receive power from one wireless power transfer system-charger 1000. In this case, the transmission side matching unit 1300 of the wireless power transfer system-charger 1000 may adaptively match the impedance between the wireless power transfer system-devices 2000. This may be similarly employed even when the magnetic induction scheme includes a plurality of coil units which are independent from each other.

In addition, when a plurality of the wireless power transfer system-devices 2000 are provided, the systems may have an identical power reception scheme, or the systems may have different types of the power reception scheme from each other. In this case, the wireless power transfer system-charger 1000 may be a system transmitting power in the magnetic induction scheme or the magnetic resonance scheme or a system using both schemes.

Meanwhile, when a size and a frequency of the signal of the wireless power transfer system are examined, in the case of the magnetic induction scheme, the transmission side AC/DC converting unit 1100 may receive an AC signal of 110 V to 220 V and 60 Hz, convert the AC signal to a DC signal of 10 V to 20 V and output the DC signal in the wireless power transfer system-charger 1000, and the transmission side DC/AC converter 1200 may receive the DC signal and output an AC signal of 125 kHz. In addition, the wireless power transfer system-device 2000 receives the AC signal of 125 KHz and converts the AC signal to a DC signal of 10 V to 20 V, and the reception side DC/DC converter 2400 may output the DC signal, for example a DC signal of 5 V, appropriate for the load 2500 and transfer the DC signal to the load 2500. In addition, in the case of the wireless power transmission using the magnetic resonance scheme, the transmission side AC/DC converter 1100 may receive an AC signal of 110 V to 220 V and 60 Hz, convert the AC signal to a DC signal of 10 V to 20 V and output the DC signal, and the transmission side DC/AC converter 1200 may receive the DC signal and output an AC signal having a frequency of 6.78 MHz in the wireless power transfer system-charger 1000. Further, the reception side AC/DC converter 2300 may receive the AC signal having the frequency of 6.78 MHz, convert the AC signal to a DC signal having a voltage of 10 V to 20 V, and output the DC signal, the DC/DC converter 2400 may output a DC signal, for example the DC signal of 5 V, appropriate for the load 2500 and transfer the DC signal to the load 2500.

Figure 5:
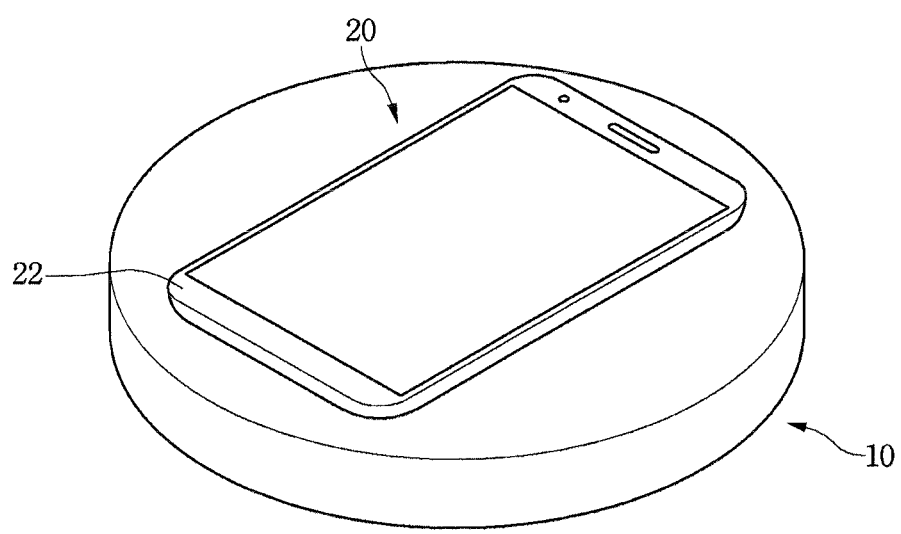
FIG. 5 is a perspective view showing the wireless power transfer system according to an embodiment.

FIG. 5 is a perspective view showing a wireless power transmission system according to an embodiment.

Referring to FIG. 5, the wireless power transmission system according to an embodiment may include a holder 10 and a terminal 20.

The holder 10 may include a power source and a wireless power transmitter as shown in FIG. 1. In other words, the power source and the wireless power transmitter may be embedded in the holder 10.

When viewed from the top, the holder 10 may have a circular, oval, square or rectangular shape, but the embodiment is not limited thereto.

A top surface of the holder 10 may make contact with a back surface of the terminal 20. At least a part of the top surface of the holder 10 may have the same shape as that of the back surface of the terminal, but the embodiment is not limited thereto.

The transmission coil (reference numerals 210 and 220 of FIG. 1) of the wireless power transmitter embedded in the holder 10 may face the top surface of the holder 10. The transmission coil 210 and 220 may be disposed in parallel with the top surface of the holder 10 such that the power of the transmission coil 210 and 220 is uniformly transmitted to the terminal 20.

The terminal 20 may include the battery 36 and may signify all electronic appliances which are capable of performing predetermined electronic functions by using the power charged in the battery 36. For example, the terminal 20 may include a mobile device such as a smart phone, a tablet PC, or a home appliance such as a television, a refrigerator or a washing machine, a vehicle such as an automobile, or a component of the vehicle.

The terminal 20 may include the apparatus for receiving wireless power and the load depicted in FIG. 1. That is, the apparatus for receiving wireless power and the load may be embedded in the terminal 20.

The terminal 20 may be placed on the top surface of the holder 10 in order to charge the terminal 20. When the terminal 20 is placed on the top surface of the holder 10, the front cover 22 of the terminal 20 may face upward such that the rear cover 24 of the terminal 20 makes contact with the top surface of the holder 10. Thus, the power may be wirelessly provided from the holder 10 to the load so that the load may be charged.

Figure 6:
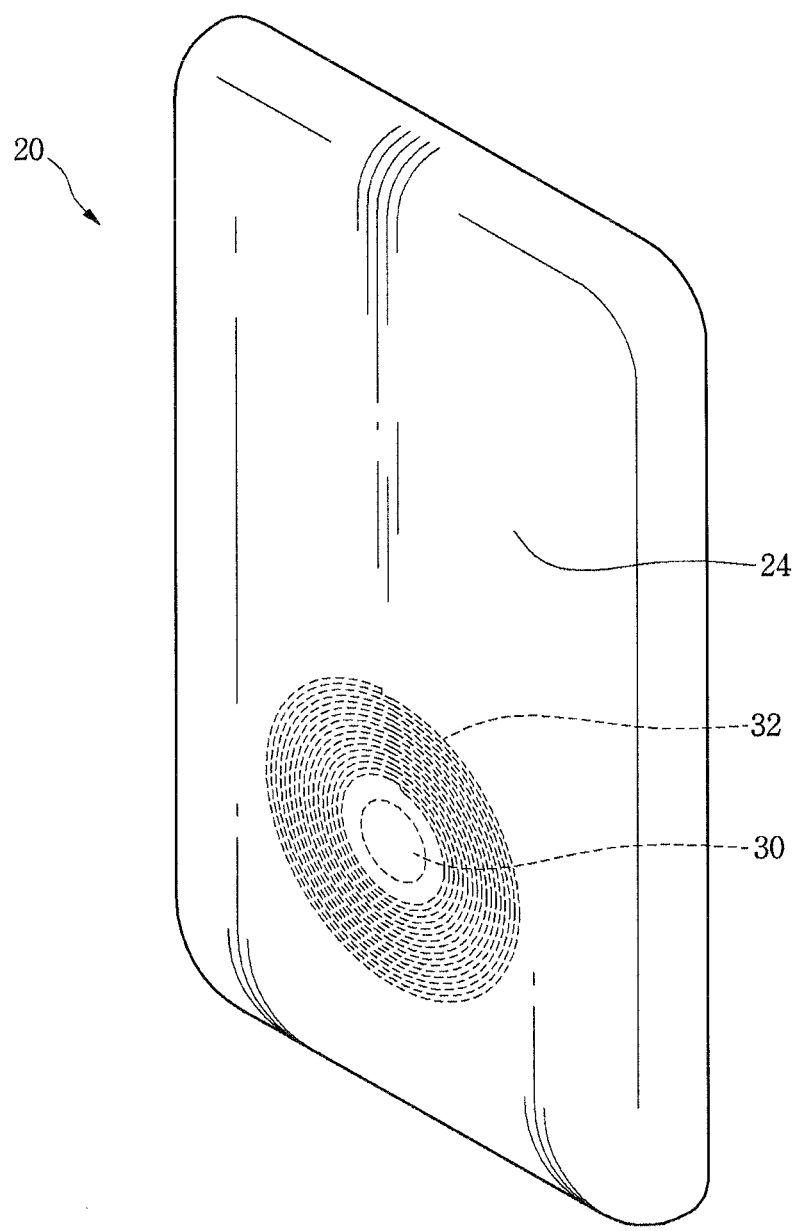
FIG. 6 is a rear view of a terminal shown in FIG. 5.

As shown in FIG. 6, a reception coil 32 and a magnet member 30 may be disposed adjacently to the back surface of the terminal 20 corresponding to the top surface of the holder 10. In addition, the reception coil 32 may be disposed to allow the transmission coils 210 and 220 of the holder 10, the top surface of the holder 10 and the rear cover 24 of the apparatus for receiving the wireless power to face each other. Specifically, when the reception coil 32 of the terminal 20 is place in parallel with the transmission coils 210 and 220 of the holder 10, the efficiency of the power transferred from the transmission coils 210 and 220 of the holder 10 to the reception coil 32 of the terminal 20 may be maximized.

A wireless power transmission system according to the embodiment will be described in more detail with reference to FIG. 7.

Figure 7:
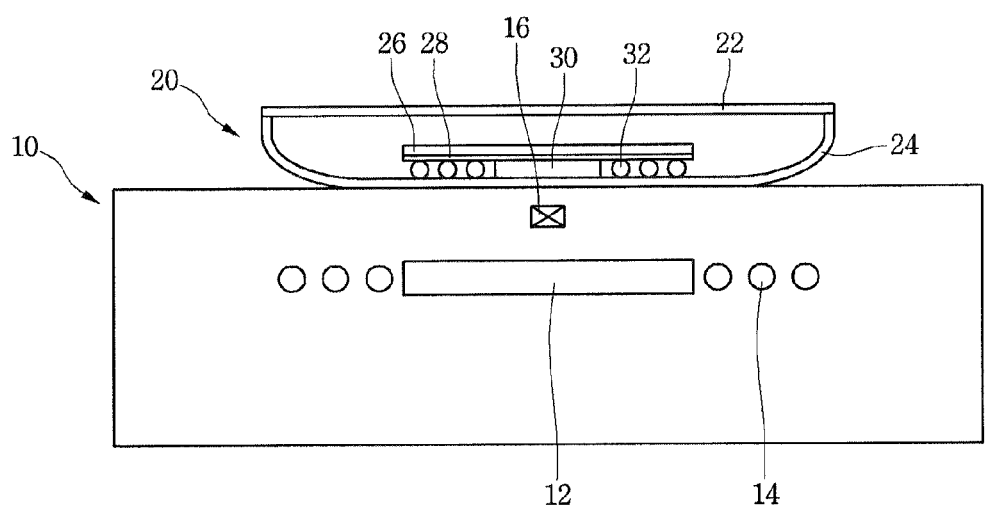
FIG. 7 is a sectional view showing the wireless power transfer system according to an embodiment.

FIG. 7 is a sectional view showing a wireless power transmission system according to an embodiment.

As shown in FIG. 7, the holder 10 may include a transmission coil 14 and a magnet member 12. The transmission coil 14 and the magnet member 12 may be disposed adjacently to the top surface of the holder 10. The transmission coil 14 and the magnet member 12 may be disposed on the same surface.

The transmission coil 14 may be the transmission induction coil or the transmission resonant coil depicted in FIG. 1. For example, while the transmission induction coil and the transmission resonant coil are all used in the case of a resonance scheme, only the transmission induction coil may be used in the case of an electromagnetic induction scheme.

The reception coil 14 may surround the magnet member 12. The transmission coil 14 may have several numbers of turns and the adjacent transmission coils 14 may be spaced apart from each other, but the embodiment is not limited thereto. The transmission coil 14 may be disposed in parallel with a virtual horizontal plane. The central region of the transmission coil 14 having the structure described above may be empty.

The magnet member 12 may be disposed in the central region of the transmission coil 14. The thickness of the magnet member 12 may be equal to, or thicker or thinner than that of the transmission coil 14. The thickness and area of the magnet member 12 may be varied according to the intensity of magnetic flux density required by the magnet member 12 and the occupying area of the magnet member 12.

The terminal 2 may include a shielding member 26, a reception coil 32 and a metal member 30. The reception coil 32 and the metal member 30 may be disposed on the same surface.

The reception coil 32 may be the reception resonant coil and/or the reception induction coil depicted in FIG. 1. For example, while the reception resonant coil and the reception induction coil are all used in the case of a resonance scheme, only the reception induction coil may be used in the case of the electromagnetic induction scheme.

The reception coil 32 may surround the metal member 30. The reception coil 32 may have several numbers of turns and the adjacent reception coils 32 may be spaced apart from each other.

The reception coil 32 may be disposed in parallel with a virtual horizontal plane. The central region of the reception coil 32 having the structure described above may be empty.

The metal member 30 may be disposed in the central region of the reception coil 32. The central region of the reception coil 32 may be less than that of the transmission coil 14, but the embodiment is not limited thereto. The thickness of the metal member 30 may be equal to, or thicker or thinner than that of the reception coil 30. The thickness and area of the metal member 30 may be varied according to the intensity of magnetic flux density required to the metal member 30 and the occupying area of the metal member 30.

The metal member 30 allows the holder 10 to sense whether the terminal 20 approaches or makes contact with the holder 10.

For the purpose of such a sensing, a hall sensor 16 may be further included. The hall sensor 16 may be disposed between the top surface of the holder and the magnet member 12, but the embodiment is not limited thereto. The hall sensor 16 may be disposed more adjacently to the top surface of the holder 10 than the magnet member 12. The hall sensor 16 may be disposed in the holder 10 between the magnet member 12 of the holder 10 and the metal member 30 of the terminal 20. The hall sensor 16 senses only the intensity of magnetic flux density of the magnet member 12 when the terminal 20 does not exist. However, when the terminal 20 approaches the holder 10, the hall sensor 16 may sense the intensity of magnetic flux density of the metal member 30 as well as the intensity of magnetic flux density of the magnet member 12. Thus, based on the intensity of magnetic flux density of the magnet member 12 sensed when the terminal 2 does not exist, the holder 10 senses the intensities of magnetic flux densities generated from the magnet member 12 and the metal member 30 when the terminal 20 is placed on the holder 10. When a variation degree (α) of the sensed magnetic flux density is greater than a threshold value, the holder 10 determines that the terminal 20 is placed on the holder 10 for charging, and then, may perform the process of charging the terminal 20.

To this end, the metal member 30 may be formed of a material which causes the variation degree (α) of the sensed magnetic flux density to be greater than the threshold value. For example, the threshold value may be equal to 32 G (Gauss). In addition, the threshold value requested in the standard may be equal to 40 G (Gauss).

The metal member 30 may be a stainless steel sheet. For example, the stainless steel sheet may contain at least 8 wt % of chrome (Cr) and 75 wt % of iron (Fe). Specifically, the metal member 30 may include a stainless steel sheet containing 16 wt % to 18 wt % of chrome (Cr) and at least 80 wt % of iron (Fe). For example, the metal member 30 may include a ferrite STS430 among the alloys. However, the embodiment is not limited thereto, and the alloy ratio of the metal member 30 may vary according to the variation degree (α) of the magnetic flux density. For example, the reception coil 32 and the metal member 30 may adhere to a back surface of the shielding member 26 by using an adhesive 28. A printed circuit board, on which electronic components including a power source, an AC power generating unit, and a control unit are mounted, may be disposed on the shielding member 26.

The shielding member 26 may shield the magnetic field induced by the coil to prevent the magnetic field from exerting an effect on an electronic component, so that the electronic component may be prevented from being an erroneously operated.

Figure 8:
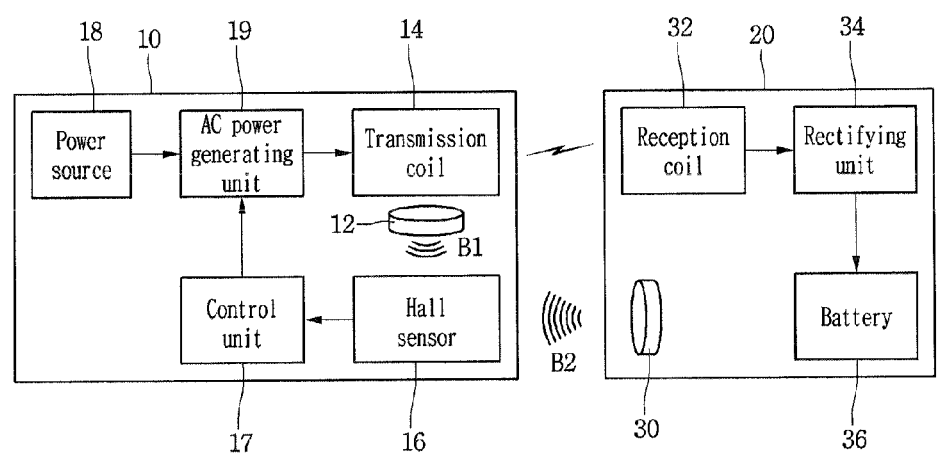
FIG. 8 a block diagram showing the wireless power transfer system according to an embodiment.

FIG. 8 a block diagram showing a wireless power transmission system according to the embodiment.

Referring to FIGS. 5 to 8, the wireless power transmission system may include a holder 10 and a terminal 20.

Since the outer appearances of the holder 10 and the terminal 2 have been described above, the circuit configurations of the holder 10 and the terminal 10 will be described below.

The holder 10 may include a power source, an AC power generating unit 19, a control unit 17, a transmission coil 14, a magnet member 12 and a hall sensor 16.

The power source may be the same as the power source depicted in FIG. 1, and the transmission coil 14 may be the same as the transmission induction coil or the transmission resonant coil depicted in FIG. 1

The power source generates AC power or DC power. The power source may convert AC power into first DC power and may convert the first DC power into second DC power.

The AC power generating unit 19 may convert the power of the power source into AC power under control of the control unit 17. The AC power converted by the AC power generating unit 19 may be transmitted to the terminal 20 through the transmission coil 14.

The control unit 17 may control the AC power generating part 19 based on the variations of the intensities of magnetic flux densities B1 and B2 sensed by the hall sensor 16.

Hereinafter, detection of a voltage signal will be described with reference to FIG. 10.

Figure 10:
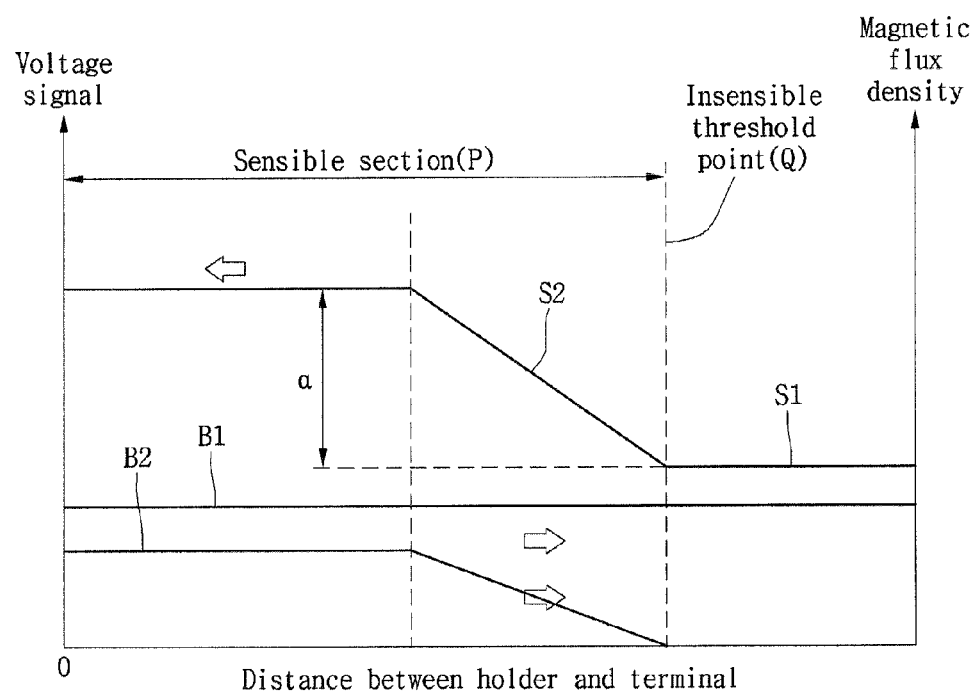
FIG. 10 is a view showing a voltage signal detected by a hall sensor according to a distance between a holder and a terminal.

As shown in FIG. 10, the hall sensor 16 may detect the intensity of the magnetic flux density B1 of the magnet member 12 included in the holder 10. When the terminal 20 is placed on the holder 10, the hall sensor 16 may detect the intensity of the magnetic flux density B2 of the metal member 30 included in the terminal 20. Although it is depicted in the drawing that the intensity of the magnetic flux density B2 of the metal member 30 is less than that of the magnetic flux density B1 of the magnet member 12, the intensity of the magnetic flux density B2 of the metal member 30 is equal to or stronger than that of the magnetic flux density B1 of the magnet member 12.

The hall sensor 16 may convert the intensities of the magnetic flux density B1 of the magnet member 12 and the magnetic flux density B2 of the metal member 30 into electric signals to provide the electric signals to the control unit 17. For example, the electric signal may include a voltage signal, but the embodiment is not limited thereto. For example, the magnetic flux density of 1 G (Gauss). may be converted into an electric signal of 5 mV. For example, when the intensity of the magnetic flux density B1 of the magnet member 12 has 10 G (Gauss), the hall sensor 16 may convert the intensity of the magnetic flux density B1 of 10 G (Gauss). detected from the magnet member 12 into an voltage signal of 50 mV and may provide the voltage signal of 50 mV to the control unit 17.

When the terminal 20 does not exist, that is, when the terminal 20 is located at a place which is out of range to sense the intensity of the magnetic flux density B2 of the metal member 30 by the hall sensor 16, the control unit 17 detects a first voltage signal S1 corresponding to the intensity of the magnetic flux density B1 of the magnet member 12.

When the terminal 2 moves into a sensible section P in which the hall sensor 16 of the holder 10 can sense the intensity of the magnetic flux density B2 of the metal member 30, the hall sensor 16 may output a second voltage signal S2 corresponding to the sum of the intensities of the magnetic flux density B1 of the magnet member 12 and the magnetic flux density B2 of the metal member 30.

A border point between the distance, which is out of range to sense the intensity of the magnetic flux density B2 of the metal member 30, and the sensible section P may be defined as an insensible threshold point Q. When the distance between the terminal 2 and the holder 10 is beyond the insensible threshold point Q, the hall sensor 16 may not sense the intensity of the magnetic flux density B2 of the metal member 30. When the distance between the terminal 20 and the holder 10 is within the insensible threshold point P, that is, the sensible section Q, the hall sensor 16 may sense the intensity of the magnetic flux density B2 of the metal member 30.

The second voltage signal S2 may be linearly increased as the terminal 20 approaches the holder 10.

The second voltage signal S2 may be saturated from a position so that the second voltage signal S2 has a constant level. The intensity of the magnetic flux density B2 of the metal member 30 is maximized at the point. Thus, the intensity of the magnetic flux density B2 of the metal member 30 may be maintained at the maximum within a predetermined distance and may be gradually decreased as the metal member 30 is located beyond the predetermined distance.

Therefore, when the terminal 20 approaches the holder 10, so that the terminal 20 enters the area of the maximum magnetic flux density B2, the second voltage signal S2 outputted from the hall sensor 16 in the area is not increased anymore and is maintained at a constant level. In other words, even when the terminal 20 is placed on the holder 10, the magnetic flux density may not increase over a maximum value. Therefore, the second voltage signal S2, which is a sum of the intensities of the magnetic flux index B2 of the metal member 30 and the magnetic flux density of the magnet member 12, may be maintained at a constant level.

When the terminal 20 is placed on the holder 10 so that the distance between the terminal 20 and the holder 10 is equal to 0 (zero), the second voltage signal S2 corresponding to the intensities of the magnetic flux density B1 of the magnet member 12 and the magnetic flux density B2 of the metal member 30 may be detected as the constant level. In this case, the second voltage signal S2 is greater than the first voltage signal S1.

For example, when the variation degree ($\alpha$) of the first and second voltage signals S1 and S2 is greater than the predetermined threshold value, the control unit 17 determines that the terminal 20 is placed on the holder 10 and controls the AC power generating unit 19 such that Ac power is transmitted through the transmission coil 14.

The terminal 20 may include a reception coil 32, a rectifying unit 34, a battery 26 and the metal member 30.

The reception coil 32 may be the reception resonant coil or the reception induction coil depicted in FIG. 1, and the battery 36 may be the load depicted in FIG. 1.

The reception coil 32 receives the AC power provided from the transmission coil 14 of the holder 10.

The rectifying unit 34 rectifies the AC power provided from the reception coil 32 to convert the AC power into DC power from which noise is removed.

The terminal 20 may include a DC-DC converting unit (not shown) which is connected between the rectifying unit 34 and the battery 36 to convert the DC power converted by the rectifying unit 34 into rated power or a rated voltage.

The terminal 20 may communicate with the holder 10 through in-band or out-of-band communication in order to provide information about the increase and decrease of the power strength required by the terminal 20 or a current charging state of the terminal 20 to the holder 10.

Although not shown, the terminal 20 may further include a managing module which senses the received AC power or the state of the battery 36 to prevent overpower from being supplied to the battery 36 and a control unit for performing the entire control.

Figure 9:
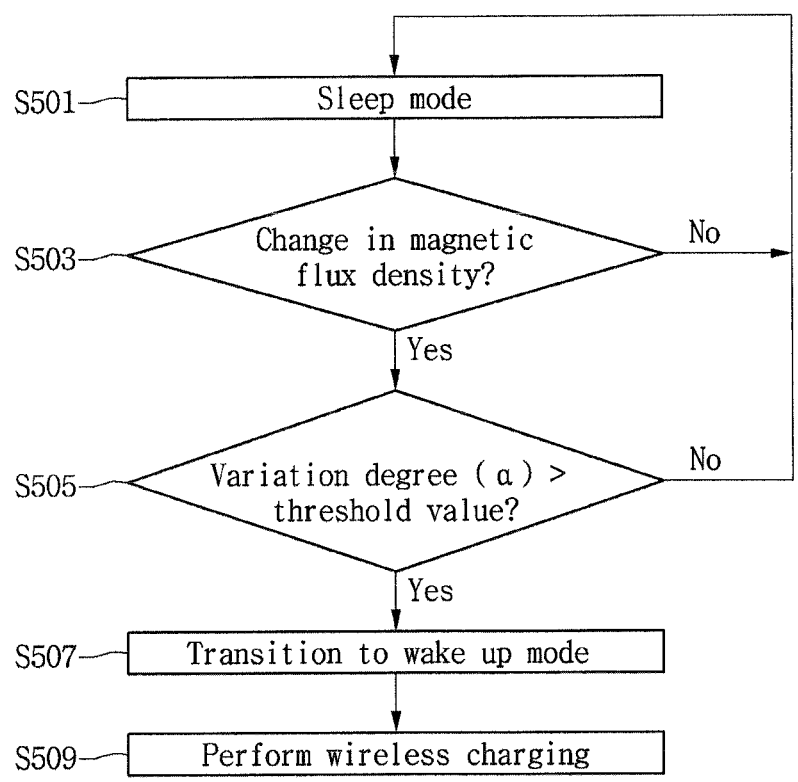
FIG. 9 is a flowchart illustrating a method of operating the wireless power transfer system according to an embodiment.

FIG. 9 is a flowchart illustrating a method of operating a wireless power transmission system according to an embodiment.

Referring to FIGS. 8 and 9, when the terminal 20 is not placed on the holder 10, the control unit 17 of the holder 10 prevents any AC power from being irradiated and is operated in a sleep mode in which only an inner essential element, for example, the hall sensor 16 is driven to minimize the current consumption.

The control unit 17 may receive the first control signal S1 corresponding to the magnetic flux density of the magnet member 12 for the hall sensor 16 as the hole sensor 16 is driven.

The control unit 17 determines whether the magnetic flux density is varied. That is, the control unit 17 may determine whether the second voltage signal S2 stronger than the first voltage signal S1 is provided from the hall sensor 16. When the terminal 20 approaches the holder 10, the second voltage signal S2 outputted from the hall sensor 16 may be gradually increased as the terminal approaches the holder 10. The second voltage signal S2 may be a signal on which the intensity of the magnetic flux density B2 of the metal member 30 is reflected as well as the intensity of the magnetic flux density B1 of the metal member 12. For example, the second voltage signal S2 may be obtained by converting the sum of the intensities of the magnetic flux density B1 of the magnet member 12 and the magnetic flux density B2 of the metal member 30, but the embodiment is not limited thereto.

The second voltage signal S2 may be increased from the first voltage signal S1. Thus, as shown in FIG. 10, the variation degree ($\alpha$) between the first and second voltage signals S1 and S2 may be gradually increased as the terminal 20 approaches the holder 10.

The control unit 17 determines whether the variation degree ($\alpha$) between the first and second voltage signals S1 and S2 is equal to or greater than the threshold value.

As the determination result, when the variation degree ($\alpha$) is equal to or greater than the threshold value, the control unit 17 is switched from the sleep mode to a wake-up mode.

The wake-up mode may be an activation process for transmitting power to the terminal 20.

In the wake-up mode, the control unit 17 performs a wireless charging operation. That is, power is provided from the power source under control of the control unit 17. The AC power generating unit 19 may generate AC power based on the power of the power source and the generated AC power may be transmitted to the terminal 20 through the transmission coil 14.

The terminal 20, which is an apparatus for receiving wireless power from the holder 10, in other words, the apparatus for transmitting wireless power, may trigger the hall sensor 16 of the holder 10 by the metal member 30. In other words, when the terminal 20 is placed on the holder 10, the hall sensor 16 may be activated by the metal member 30.

The terminal 20 is detected by the hall sensor 16 of the holder 10, and an effective signal of the terminal 20 is transmitted to the holder 10. In other words, the effective signal may be a signal for receiving power from the holder 10.

The terminal 20 may receive an identification signal (RXID) which is allocated to the apparatus for receiving wireless power from the holder 10, in other words, the apparatus for transmitting wireless power.

When the terminal 20 receives the identification signal, the terminal 20 may receive power for charging the terminal 20. The amount of the received power may be a threshold value or an amount requested from the terminal.

Hereinafter, an optimal arrangement design structure of the metal member 30 included in the terminal 20 according to an embodiment will be described.

Figure 11:
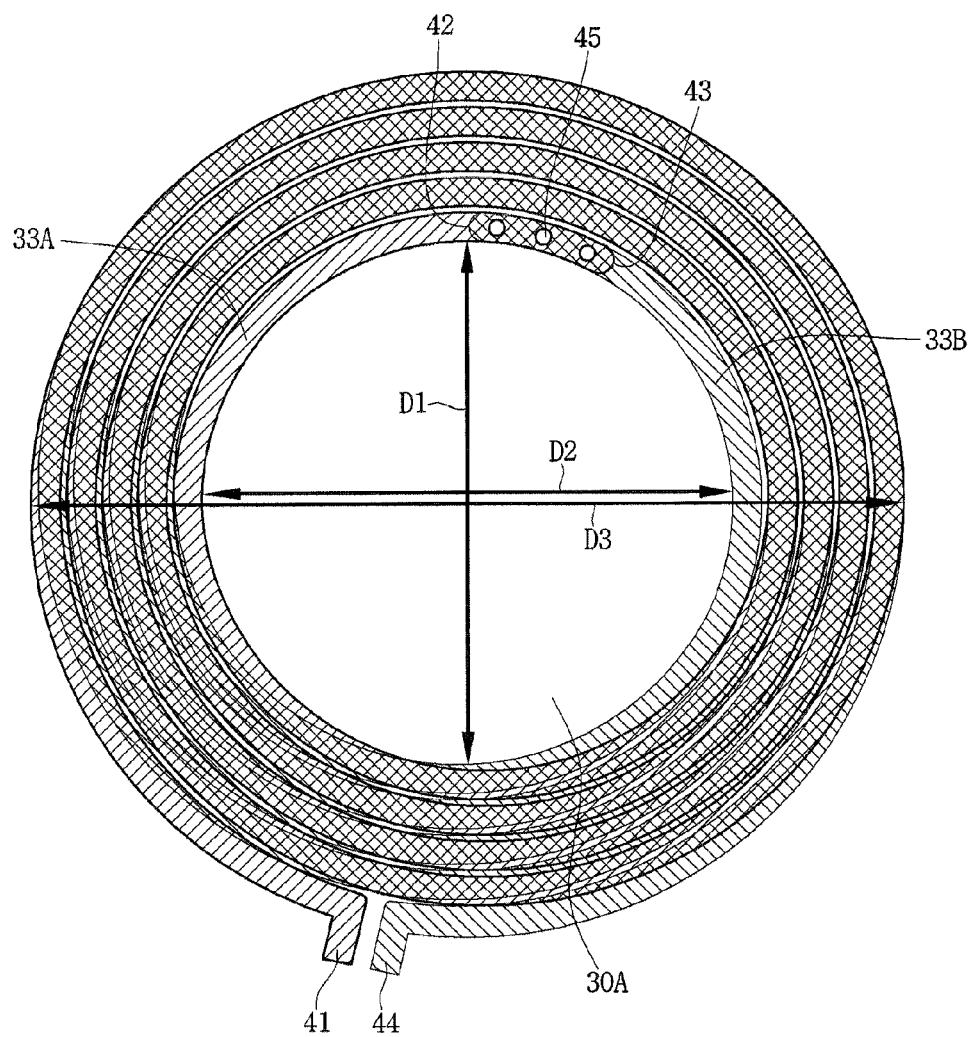
FIG. 11 is a view showing a metal member disposed in a winding coil structure.
Figure 12:
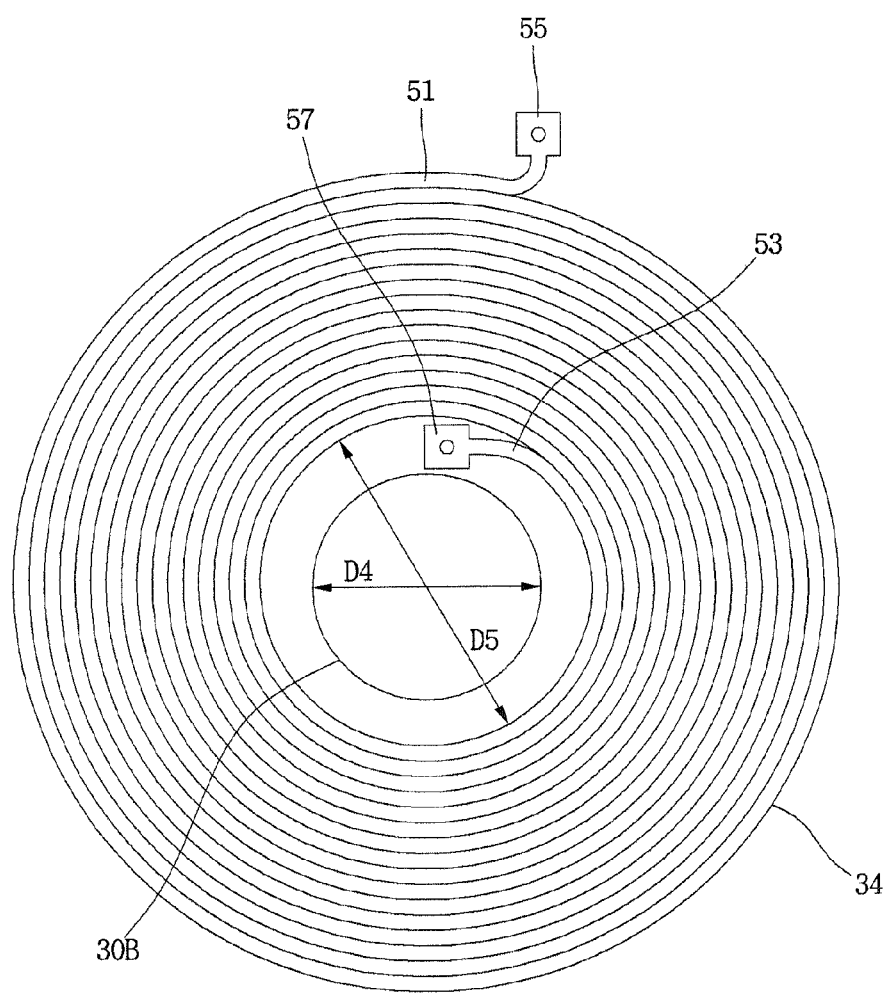
FIG. 12 is a view showing a metal member disposed in a lead frame coil structure.

The reception coil 32 included in the terminal 20 may be classified into a winding coil structure (FIG. 11) and a lead frame coil structure (FIG. 12).

The winding coil may be formed by stacking two coils as an upper part and a lower part. After the winding coil 33A is wound such that the diameter of the first coil is gradually reduced corresponding to a predetermined number of turns, the other end of the first coil 33A is stacked with one end 43 of the second coil. The second coil 33B is wound such the second coil is stacked with the first coil 33A and the diameter of the second coil is gradually increased so the one end 41 of the first coil 33A becomes adjacent to the other end 44 of the second coil 33B. In this case, the first coil 33A and the second coil 33B may be stacked into the upper part and the lower part, respectively, by having an insulation layer therebetween. Therefore, the other end 42 of the first coil 33A and the one end of the second coil 33B may be connected by way of a through hole passing through the insulation layer.

Therefore, the metal member 30A may be disposed in the central region formed at an inner part of the wound coil 33.

The specification of the winding coil 33 is as Table 1 below.

TABLE 1

| Parameter | Minimum (Min) | Target | Maximum (Max) | Unit | Remarks |
|---|---|---|---|---|---|
| Inner diameter(D2) | 19.9 | 20 | 20.1 | mm | |
| Outer diameter(D3) | 32.9 | 33 | 33.1 | mm | |
| Net width | 38 | 40 | 42 | mil | |
| Space between nets | | 15 | | mil | |
| Turns per layer | | 4.5 | | | |
| Layer | | 2 | | | Top/Bottom |
| Copper thickness | | 2 | | Oz | |
| PCB thickness | 0.36 | 0.4 | 0.44 | mm | |

In this case, the inner diameter D3 is a diameter of the central region of the winding coil and is preferably 19.9 mm to 20.1 mm. More preferably, the diameter D2 may be 20 mm. In addition, the outer diameter D3 is a diameter to the outer end of the winding coil and is preferably 32.9 mm to 33.1 mm. More preferably, the diameter D3 may be 33 mm. In addition, the net width denotes a width of the coil. Further, the space between nets denotes an interval between the first coil 33A and the second coil 33B.

As shown in Table 1, the turns of the first coil 33A and the second coil 33B may be 4.5. The winding coil 33 may have a pattern etched in copper, and the thickness of the copper may be 2 Oz. In addition, a thickness of a PCB including the winding coil 33 may be 0.36 mm to 0.44 mm. The thickness of the PCB may preferably be 0.4 mm.

The lead frame coil 34 may have one end 51 connected to a first pad 55 and the other end 53 connected to a second pad 57. The lead frame coil 34 may be wound by the predetermined number of turns from the one end 51 to the other end 53 such that the diameter is gradually reduced. In this case, the second pad 57 connected to the other end 53 may be disposed in the coil having a number of turns.

As described above, the central regions of the winding coil 33 and the lead frame coil 34 are empty. The second pad 57 connected to the other end 53 of the lead frame coil 34 may be disposed in the central region.

Since pads do not exist in the central region of the winding coil 33, the metal member 30A may have a diameter D1 approximate to the diameter D2 of the central region.

To the contrary, since the second pad 57 of the lead frame coil 34 is disposed in the central region, the metal member 30B may have a diameter D4 less than the diameter D5 of the central region.

Thus, the diameter D1 of the metal member 30A disposed in the central region of the winding coil 33 may be greater than the diameter D4 of the metal member 30B in the central region of the lead frame coil 34.

Figure 13:
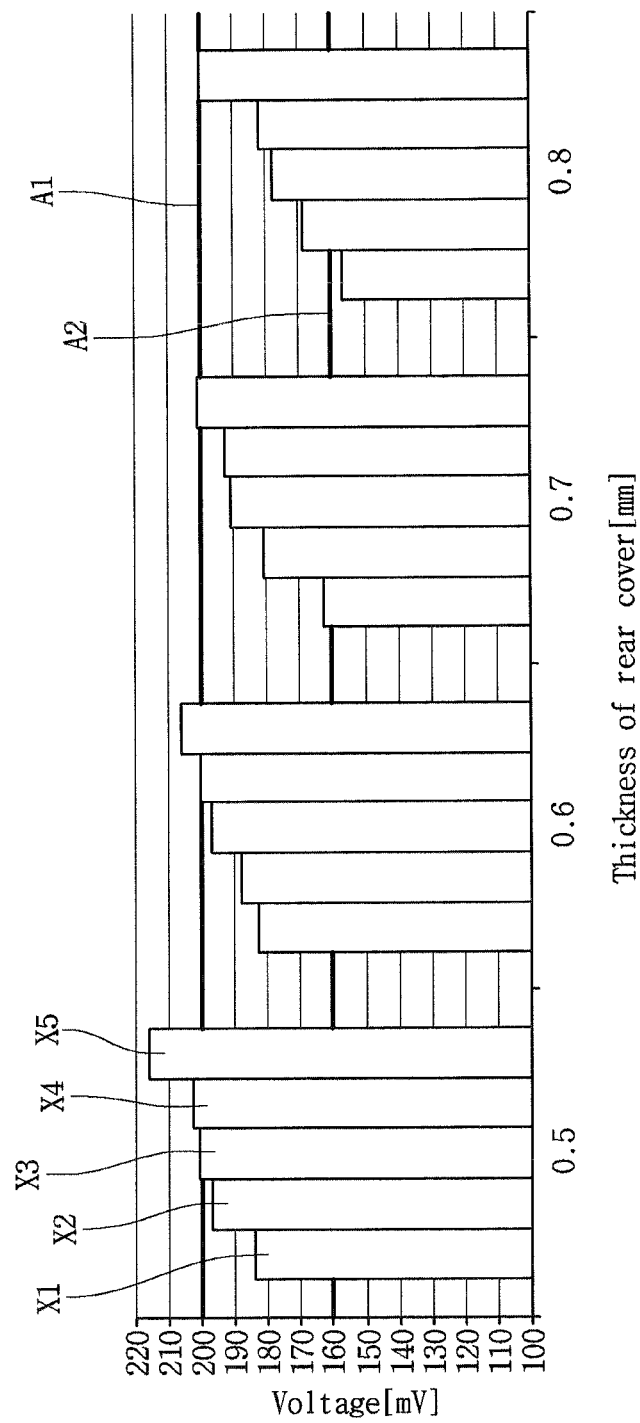
FIG. 13 is a view showing an intensity of a magnetic flux density according to a position of the metal member in a lead frame coil structure.

FIG. 13 is a view showing an intensity of a magnetic flux density according to a disposition of the metal member in a lead frame coil structure.

For the purpose of experiment, samples proposed in table 2 were used. The thickness of the metal member 30B was fixed at 150 mm.

TABLE 2

| Sample | Thickness of rear cover (24) [mm] | Diameter/area of metal member 30B [mm/mm$^2$] | Ratio of area of the metal member 30A to the available area [%] |
|---|---|---|---|
| #1 | 0.5 | 8/50 | 44 |
| #2 | 0.6 | 8/50 | 44 |
| #3 | 0.7 | 8/50 | 44 |
| #4 | 0.8 | 9/64 | 56 |
| #5 | 0.5 | 11/95 | 84 |
| #6 | 0.6 | 11/95 | 84 |
| #7 | 0.7 | 12/113 | 100 |
| #8 | 0.8 | 12/113 | 100 |

In this case, the available area, in which the metal member 30B is disposed, may be varied according to whether the pad is disposed in the central region. Since, while the second pad 57 exists in the central region in the lead frame structure, the second pad 57 does not exist in the central region in the winding frame structure, so the available area in the lead frame structure may be less than that in the structure of the wilding coil 33. In this case, when the metal member 30B having the same diameter is disposed, the ratio of the area of the metal member 30B to the available area in the lead frame coil structure is greater than that in the structure of the winding coil 33.

In FIG. 13, X1 to X5 denote diameters of the metal member 30B, where X1 is equal to 8 mm, and X2 is equal to 9 mm. In addition, X3 to X5 are equal to 10 mm, 11 mm and 12 mm, respectively.

The horizontal axis represents a thickness of the rear cover 24 of the terminal 20 and the vertical axis represents the voltage value converted corresponding to the intensity of the magnetic flux density B2 of the metal member 30B. The voltage value may be obtained by multiplying the intensity of the magnetic flux density B2 by 5. For example, when the intensity of the magnetic flux density B2 of the metal member 30B is equal to 30 G (Gauss), the voltage value may be equal to 120 mV.

The reference numeral A1 in FIG. 13 represents a preferable voltage value of 200 mV defined in the standard, and the reference numeral A2 represents a recommended voltage value of 160 mV required in the standard. The metal member 30B may have the intensity of the magnetic flux density of 40 G (Gauss) in order to obtain the preferable voltage value of 200 mV, and the metal member 30B may have the intensity of the magnetic flux density B2 of 32 G (Gauss) in order to obtain the recommended voltage value of 160 mV.

There is a need to dispose the metal member 30B to allow the voltage value to be equal to or greater than the recommended voltage value (160 mV) in order to meet the standard.

As shown in FIG. 13, when the thickness of the rear cover 24 was in the range of 0.5 mm to 0.8 mm, the intensity of the magnetic flux density B2 of the metal member 30B was beyond 160 mm.

In addition, when the thickness of the rear cover 24 was in the range of 0.5 mm to 0.7 mm and the diameter of the metal member 30B was in the range of 8 mm to 12 mm, the intensity of the magnetic flux density B2 of the metal member 30B was beyond 160 mm.

When the thickness of the rear cover 24 was equal to 0.8 mm and the diameter of the metal member 30B was in the range of 9 mm to 12 mm, the intensity of the magnetic flux density B2 of the metal member 30B was beyond 160 mm. However, when the diameter of the metal member 30B was equal to 8 mm, the intensity of the magnetic flux density B2 of the metal member 30B was equal to or less than 160 mm.

If the diameter of the metal member 30B is equal to or more than 12 mm, the intensity of the magnetic flux density B2 of the metal member 30B may be further increased. However, as the diameter of the metal member 30B is increased, the power reception efficiency may be deteriorated. That is, in order to improve the power reception efficiency, the power transmitted from the holder 10 must be effectively received. However, as the diameter of the metal member becomes larger, the magnetic flux becomes greater. The increased magnetic flux density prevents the reception coil 32B of the terminal from generating current, so that the terminal 20 may not effectively receive the power from the holder 10.

Thus, if the power reception efficiency of the terminal 20 is ensured, the diameter of the metal member 30B may be equal to or more than 120 mm. Even in this case, the maximum diameter of the metal member 30B cannot exceed a diameter obtained based on the available area. For example, when the available area is equal to 130 mm$^2$, since the available area is equal to 3.14r$^2$, the radius r is equal to 6.43 mm, the diameter D of the available area may be equal to 2r, that is, 12.86 mm.

If the power reception efficiency of the terminal 20 is not ensured, it is preferable to set the diameter of the metal member 30B to be equal to or less than 12 mm.

Meanwhile, table 2 shows an arrangement standard of the metal member 30A in the winding coil structure.

TABLE 3

| Sample | Thickness of rear cover (24) [mm] | Diameter/area of metal member 30B [mm/mm$^2$] | Ratio of area of the metal member 30A to the available area [%] |
|---|---|---|---|
| #1 | 0.5 | 8/50 | 22 |
| #2 | 0.6 | 8/50 | 22 |
| #3 | 0.7 | 8/50 | 22 |
| #4 | 0.8 | 9/64 | 28 |
| #5 | 0.5 | 11/95 | 42 |
| #6 | 0.6 | 11/95 | 42 |
| #7 | 0.7 | 12/113 | 50 |
| #8 | 0.8 | 12/113 | 50 |

As shown in table 3, the arrangement standard of the second magnet 30A in the winding coil structure is the same as that of the second magnet 30B in the lead frame coil structure. Only, as described above, since the winding coil 32 has no pads, there pads do not exist in the central region of the winding coil 32. Thus, the central region of the winding coil 33 may be utilized as an arrangement space only for the metal member 30A. Therefore, the entire central area of the winding coil 33 may become an available area. Thus, the ratio of the area of the metal member 30A to the available area in the winding coil structure may be less than that in the lead frame coil structure. For example, as shown in table 2, while the ratio of the area of the metal member 30B to the available area in the lead frame coil structure is in the range of 44% to 100%, as shown in table 3, the ratio of the area of the metal member 30A to the available area in the winding coil structure is in the range of 22% to 50%.

Although experiment data about the intensity of the magnetic flux density of the metal member 30A in the winding coil structure based on table 3 are not shown, it may be sufficiently expected that the intensity of the magnetic flux density B2 of the metal member 30A in the winding coil structure has a tendency similar to that of the intensity of the magnetic flux density B2 of the metal member 30B in the lead frame structure.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for receiving wireless power from an apparatus for transmitting the wireless power, the apparatus for receiving the wireless power comprising:
   a coil to receive the wireless power and wound to have a hollow portion; and
   a metal member disposed within the hollow portion, that varies a magnetic flux density of the wireless power transmitting apparatus and is sensed by the apparatus for transmitting the wireless power by the variation of the magnetic flux density,
   wherein the metal member includes a stainless steel plate,
   wherein the coil includes any one of a winding coil structure and a lead frame coil structure, and
   wherein a ratio of an area of the metal member to the hollow portion of the lead frame coil is in a range of 44% to 100%, and a ratio of an area of the metal member to the hollow portion of the winding coil structure is in a range of 22% to 50%.

2. The apparatus according to claim 1, wherein the stainless steel plate is an alloy containing at least 8 wt % of chrome (Cr) and at least 75 wt % of iron (Fe).

3. The apparatus according to claim 1, wherein the stainless steel plate is an alloy containing 16 wt % to 18 wt % of chrome (Cr) and at least 80 wt % of iron (Fe).

4. The apparatus according to claim 1, wherein the stainless steel plate comprises STS430.

5. The apparatus according to claim 1, wherein an intensity of a magnetic flux density of the stainless steel plate is at least 32 G (Gauss).

6. The apparatus according to claim 1, wherein the stainless steel plate has a diameter in a range of 8 mm to 12 mm.

7. The apparatus according to claim 1, wherein the winding coil structure includes a first coil and a second coil, and the first coil and the second coil are stacked.

8. The apparatus according to claim 7, wherein the first coil is wound in such a manner that a diameter of the first coil becomes smaller from one end of the first coil corresponding to a predetermined number of windings, and an opposite end of the first coil is connected to one end of the second coil to allow the second coil to be wound in such a manner that a diameter of the second coil becomes increased corresponding to a predetermined number of windings.

9. The apparatus according to claim 8, further comprising an insulation layer provided between the stacked first coil and the second coil, wherein the opposite end of the first coil and the one end of the second coil are connected by way of a through hole.

10. A method for receiving wireless power from an apparatus for transmitting the wireless power, the method comprising:

triggering a sensor of the wireless transmitting apparatus for transmitting the wireless power by a metal member in an apparatus for receiving the wireless power;

transmitting an effective signal to the apparatus for transmitting the wireless power;

receiving an identification signal from the apparatus for transmitting the wireless power; and receiving the wireless power from the apparatus for transmitting the wireless power, wherein the metal member varies a magnetic flux density of the wireless power transmitting apparatus and is sensed by a variation of the magnetic flux density, and wherein the metal member includes a stainless steel plate.

11. The method according to claim 10, wherein the stainless steel plate comprises an alloy containing at least 8 wt % of chrome (Cr) and at least 75 wt % of iron (Fe).

12. The method according to claim 10, wherein the stainless steel plate comprises an alloy containing 16 wt % to 18 wt % of chrome (Cr) and at least 80 wt % of iron (Fe).

13. The method according to claim 10, wherein the stainless steel plate comprises STS430.

* * * * *